(No Model.) 3 Sheets—Sheet 3.

G. H. FLETCHER.
WEIGHING AND DUMPING VEHICLE.

No. 589,707. Patented Sept. 7, 1897.

WITNESSES:

INVENTOR
G. H. Fletcher
BY
ATTORNEYS.

UNITED STATES PATENT OFFICE.

GEORGE H. FLETCHER, OF NEW YORK, N. Y., ASSIGNOR OF THREE-FOURTHS TO JAMES LAWSON AND ANNA FLETCHER, OF SAME PLACE.

WEIGHING AND DUMPING VEHICLE.

SPECIFICATION forming part of Letters Patent No. 589,707, dated September 7, 1897.

Application filed October 7, 1896. Serial No. 608,116. (No model.)

*To all whom it may concern:*

Be it known that I, GEORGE H. FLETCHER, of New York city, in the county and State of New York, have invented new and useful Improvements in Weighing and Dumping Vehicles, of which the following is a full, clear, and exact description.

This invention relates to wheeled vehicles designed for weighing the article that may be placed therein, and also having means for dumping the material or article from the body of the vehicle.

The object is to provide a vehicle—such, for instance, as a wagon or cart—with means by which the purchaser of a commodity—such, for instance, as coal—may, if desired, ascertain the correct weight thereof, it of course being useful also to the seller of the commodity, as the same may be weighed as it is placed in the vehicle.

A further object is to provide a simple means by which the body portion may be raised and inclined to dump the material either laterally or through the rear end of the vehicle-body.

I will describe a weighing and dumping vehicle embodying my invention and then point out the novel features in the appended claims.

Reference is to be had to the accompanying drawings, forming a part of this specification, in which similar characters of reference indicate corresponding parts in all the views.

Figure 1:
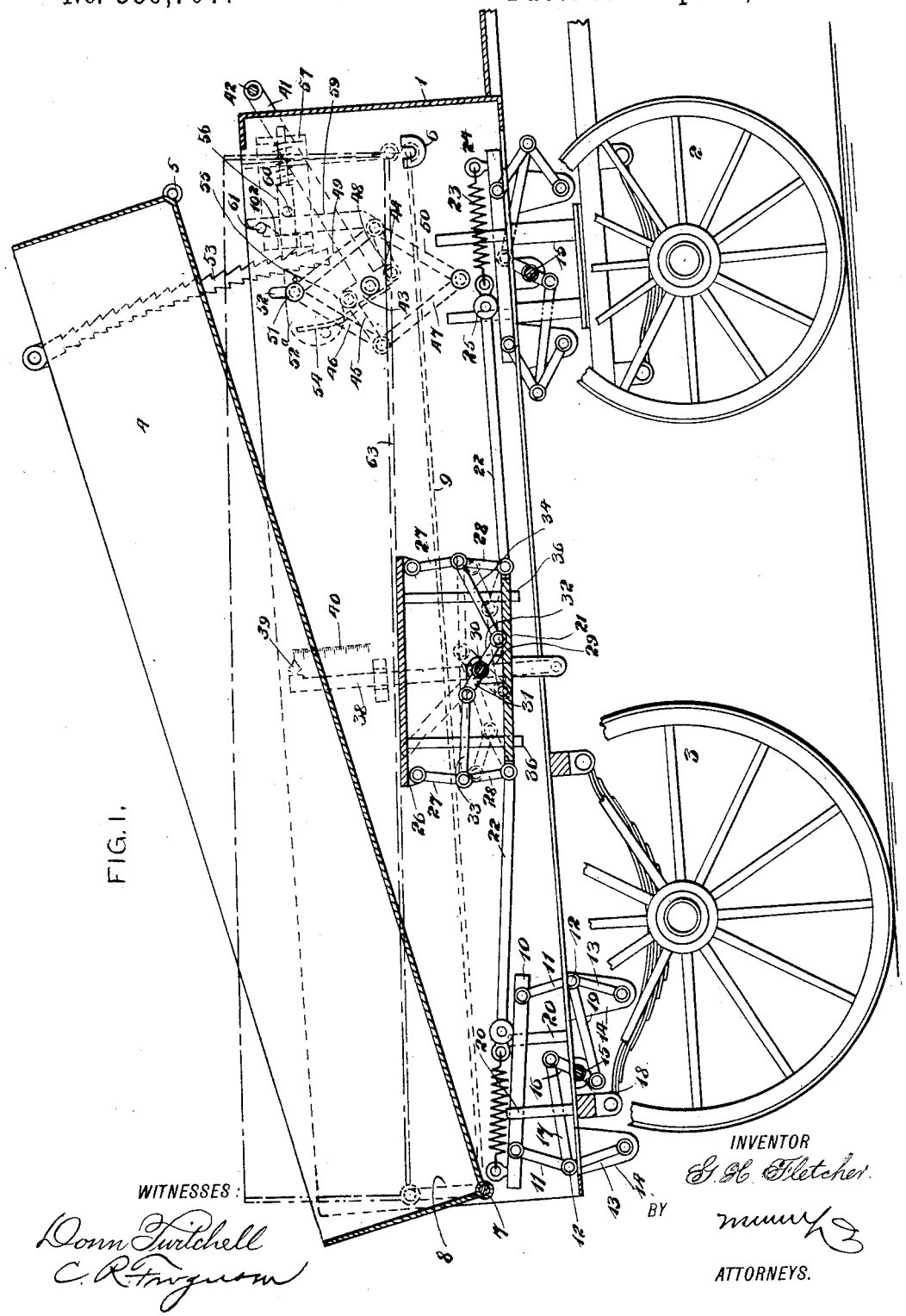
Figure 2:
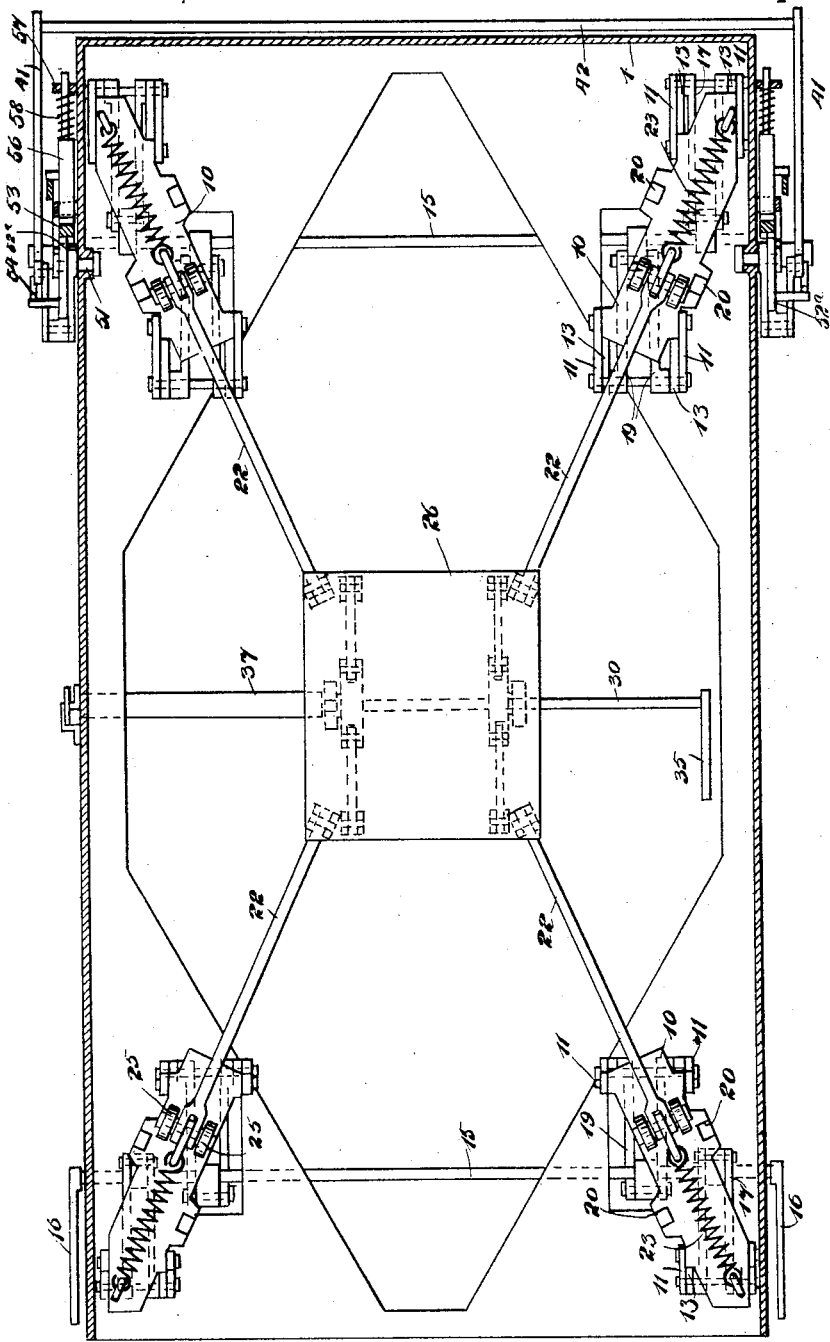
Figure 3:
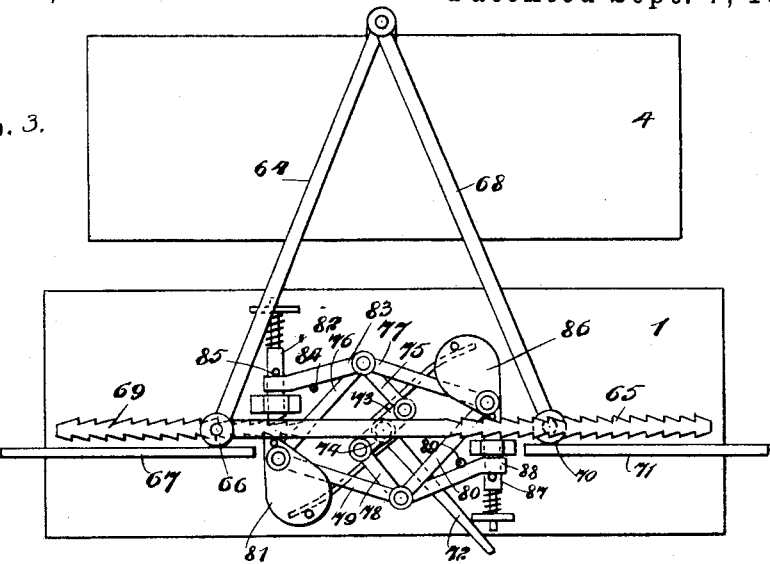
Figure 4:
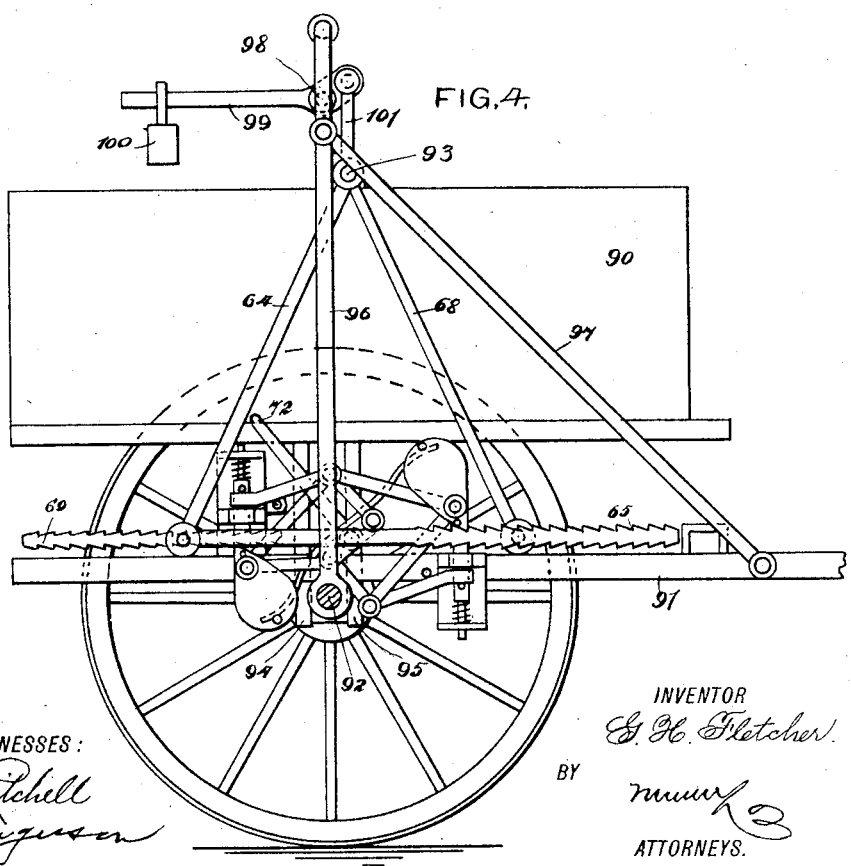

Figure 1 is a vertical section in partial elevation of a weighing and dumping vehicle embodying my invention. Fig. 2 is a plan view of the weighing device thereof and also showing the dumping means. Fig. 3 is an elevation showing a modified construction of the dumping means, and Fig. 4 is a modification showing the invention as applied to a two-wheeled cart and also showing a modified construction of the weighing device.

Referring first to the example of my improvement shown in Figs. 1 and 2, 1 designates a framework of any suitable material—such, for instance, as angle-iron—open at its top and bottom and rear end. This framework rests upon the axle supported by the wheels 2 and 3 of the body portion of a four-wheeled vehicle in the usual manner.

Arranged within the framework 1 is a box or body portion 4, designed to receive the material to be weighed. This body portion 4, of course, is closed at its sides, ends, and bottom. Its rear end may, however, be made in the form of a swinging gate. At its forward end the body portion 4 has laterally-extended lugs 5, designed normally to rest in U-shaped blocks 6, secured to the inner sides of the framework 1, and the rear end of said body portion is mounted to swing on a shaft 7, the ends of which project into vertical slots 8, formed in the sides at the rear portion of the framework 1. When in its normal position, the bottom of the body portion will extend on the dotted line 9 shown in Fig. 1 and somewhat above the bottom of the framework 1. Of course at this time the lugs 5 will engage in the U-shaped blocks 6 and the ends of the shaft 7 will rest in the lower ends of the slots 8.

I will now describe the means shown in Figs. 1 and 2 for weighing the body portion 4 and the contents thereof. Arranged in the bottom portion of the framework 1 and at each corner thereof is a track-plate 10. Each track-plate 10 has its inner end inclined toward the center of the framework, and from each end of the track-plates 10 toggle links 11 extend downward to a connection with shafts 12, and from these shafts 12 toggle-links 13 extend downward to a pivotal connection on lugs extended from hangers 14, depending from the bottom portion of the framework 1.

A shaft 15 extends transversely of the framework 1 at its rear end and has bearings in lugs depending from said framework, and at its ends outside the framework this shaft 15 is provided with operating-levers 16. A similar shaft 15 is arranged at the forward end of the framework 1 to operate the opposite track-plates thereof. Arms 16 extend upward from the shaft 15, and from these arms 16 links 17 extend to pivotal connections with the rear shafts 12 of a track-plate, and from this shaft 15 arms 18 extend downward and have connection, by means of links 19, with the forward shafts 12 of said track-plates. Obviously by rotating the shaft 15 by manipulating either one of the levers 16 the toggle-links 11 and 13 may be operated to raise the track-plates 10. It will be seen that the arms 18, depending from the shaft 15, are somewhat shorter than the arms 16. Therefore the inner ends of the track-plates will have a less vertical motion than the opposite ends, the purpose of which will hereinafter more fully appear. Each track-plate 10 may be guided vertically by means of posts 20, extended upward from the bottom of the framework 1 and engaging in notches formed in the side edges of the track-plates.

Arranged centrally of the framework 1 and below the body portion 4 is a weighing device comprising a platform 21, from the corners of which rods 22 extend to a connection with springs 23, the opposite ends of said springs 23 being connected to eyes or similar devices 24 at the outer ends of the track-plates 10. Preferably each rod 22 will be provided at its end engaging with the spring 23 with antifriction-rollers 25, adapted to bear and run upon the upper surface of the track-plate. Of course the rods 22 will have pivotal connection at the corners of the scale-plate 21.

Arranged above the scale-plate 21 and adjustable vertically with relation thereto is a top or supporting plate 26. At each corner the plates 21 and 26 are connected together by toggle-links 27 and 28. Mounted in bearings 29, supported on opposite sides of the plate 21, is a shaft 30. On one end of this shaft 30 are rigidly secured oppositely-extended arms 31 32, and similar arms 31 32 are extended in opposite directions from the other end of said shaft. From the arms 31 links 33 extend to a connection with the joint between the rear toggle-links 27 and 28, and from the arms 32 links 34 extend to a connection with the joint between the forward toggle-links 27 and 28.

The shaft 30 is provided at one end with an operating-lever 35, and any suitable locking mechanism may be provided for securing the shaft as adjusted. The plate 26 is guided in its vertical movement with relation to the plate 21 by means of rods 36, secured at the upper end to the plate 26 and movable through guideways in the side edges of the plate 21. Extended downward and outward from the lower plate 21 is an arm 37, to the outer end of which and at the outer side of the framework 1 is pivotally connected the lower end of a beam 38, provided at its upper end with a pointer 39, movable over a scale 40, and by means of which the weight of the material in the body portion 4 may be ascertained.

Before elevating the weighing-plate 26 it is necessary to raise the body portion 4, as indicated in full lines in Fig. 1, and I will now describe the mechanism for this purpose. (Shown in Figs. 1 and 2.)

Arranged upon each side at the forward end of the framework 1 is a forwardly-extended lever 41, these opposite levers being at their opposite ends connected by a cross-bar 42. Each lever 41 is pivoted on a stud extended from the sides of the framework 1, and this pivotal point has oppositely-extended arms 43 44. From the arm 43 links 45 extend to a pivotal connection with the joint between toggle-links 46 and 47, and from the arm 44 a similar link 48 extends to a pivotal connection with the joint between the toggle-links 49 and 50. The toggle-links 46 and 49 are pivotally connected at their upper ends by means of a link 51, which extends into a vertical guide-slot 52, formed in the side of the framework 1, and the lower ends of the toggle-links 47 and 50 are also pivotally connected together.

Pivoted on the lug 51 is a pawl $52^a$, adapted to engage with teeth formed on one side of a ratchet or rack bar 53, having pivotal connection at its upper end with lugs on the upper edge of the body portion 4. This pawl $52^a$ is held in yielding engagement with the teeth of the rack-bar 53 by means of a spring 54, extended from the pivotal end of the lever 41 and engaging against a pin extended from the pawl, and to prevent the pawl from moving too far downward with relation to the rack-bar I may extend a pin 55 from the pointed end of said pawl to engage upon the link 49. The opposite side teeth of each rack-lever are engaged by a horizontally-movable dog 56. Each dog 56 has a stem portion movable through a guideway 57, and a spring 58, engaging at one end against said guideway and at the opposite end against the dog, serves to hold the dog yieldingly against the teeth of the rack-bar. It will be seen that the engaging end of each dog is inclined downward and outward. From the pivotal point between the links 49 and 50 a fulcrumed arm 59 extends upward between a pin 60, projected laterally from the dog 56, and a pin 61, projected from the frame 1.

The operation of the device as so far described is as follows: When it is desired to weigh a load, the levers 41 will be rocked up and down, and this movement of the levers will cause the several toggle-links to impart an up-and-down motion to the pawls $52^a$, so that these pawls will alternately engage with the teeth at one side of the rack-bar 53. During an upward movement of the rack-bars the dogs 56 will be moved longitudinally outward by means of the inclined teeth of the rack-bar 53 with which said dogs engage, and then when a reverse movement is imparted to the levers to force the pawls $52^a$ downward to engage with the next succeeding teeth of the rack-bars the dogs 56 will move into engagement with the teeth of the rack-bars and hold the said rack-bars from downward movement. When it is desired to lower the body portion 4, the levers 41 are moved first upward, and this upward movement of the levers 41 will move the dogs 56 out of engagement with the teeth of the rack-bar by means of the cam-surfaces 62 on the upper ends of the arms 59 engaging with the pins 61. During this upward movement of the levers 41 it is obvious that the upper and lower ends of the several toggle-links will be caused to move toward each other, carrying the pawls 52ª downward, and as the teeth of the rack-bar engage the said pawls it is obvious that the rack-bars may be moved downward or allowed to lower. Then on a downward movement of the levers it is obvious that the dogs 56 will be moved into engagement with the teeth of the rack-bar by means of the springs 58, and at the same time the pawls 52ª will be moved upward for another engagement with the rack-bar. After the body portion 4 containing the load shall have been moved to substantially the position shown in Fig. 1 by the means just described, or in fact by any other means, as I do not wish to be confined to the particular means herein shown and described, the plate 26 must be elevated relatively to the plate 21. This may be done by rotating the shaft 30. When sufficiently elevated, the shaft may be locked to retain the plate 26 in its elevated position by any suitable means. However, it is obvious that this upward movement will throw the joint connections between the links 27 and 28 outward beyond the vertical line drawn between the pivotal points of the links with the plates, and such deflection of the links will serve to support the plate 26 in its vertical position. After the plate 26 shall have been so elevated the body portion containing the load will be lowered onto the plate 26, where it will rest, as indicated by the dotted lines 63 in Fig. 1, and then of course the springs 23 will yield under the weight of the load and the pointer 39 will indicate on the scale 40 the weight of the load. It is to be understood that before weighing the load the rack-bars 53 must be released at their pivotal points from their connection with the body portion 4. It is obvious that the springs 23 will be suitably gaged to give the exact weight. It may be here stated that as the object of this example of my improvement is to provide a spring-balance the rods 22 may be omitted and the springs 23 extended directly to an engagement with the plate 21.

When the wheels of the wagon are on a level plane, the track-plates 10 may remain in the position indicated in the front end of Fig. 1; but should one end of the wagon be elevated it is desired to level the weighing-plates and also to level the body portion 4, resting thereon. Therefore the track-plates 10 at the lower end of the wagon should be elevated by the means heretofore described, as indicated at the upper end of Fig. 1.

In the modification shown in Fig. 3 I have illustrated a means whereby the body portion 4 may be elevated, so that the same can be tilted sidewise to discharge a load at the side of the vehicle, as such construction might be preferable in narrow or crowded streets. Referring to this Fig. 3, 64 designates a lifting-bar pivoted at its upper end to the upper portion of the body 4 and at the end thereof. The lower end of this rod 64 is pivotally connected to a horizontally-movable rack-bar 69, having teeth on its upper and lower edges, and the lower end of this rod 64 is also provided with a roller or rollers 66, which bear upon the track-plate 67, secured to the end portion of the frame 1. Extended also from the upper pivot of the rod 64 is a similar rod 68, pivotally connected at its lower end to a horizontally-movable rack-bar 69, having ratchet-teeth on its upper and lower edges, and the lower end of this bar 68 is also provided with a roller or rollers 70, designed to run on a track-plate 71, secured to the framework 1. Mounted to rock on a stud fixed to the end of the frame portion 1 is a lever 72, and this lever 72 at its pivotal point is provided with oppositely-extended arms 73 74. From the arm 73 a link 75 extends to the pivotal connection of toggle-links 76 and 77, and from the arm 74 a link 78 extends to the pivotal connection between toggle-links 79 and 80. Upon the pivotal connection between the toggle-links 76 and 79 is a pawl 81, engaging with the rack-teeth on the lower edge of the rack-bar 69, and held in yielding engagement with the teeth on the upper edge of said rack-bar 69 is a vertically-movable dog 82, and extending from the pivotal connection between the toggle-links 76 and 77 is an arm 83, which passes over a fixed pin 84 and engages the under side of a pin 85, extended from the dog 82. To the pivotal connection between the toggle-links 77 and 80 is pivotally connected a pawl 86, designed for engagement with the upper teeth of the rack-bar 65, and adapted to engage with the lower teeth of this rack-bar 65 is a vertically-movable spring-pressed dog 87. The upper side of a pin extended from the dog 87 is engaged by the outer end of an arm 88, passing under a fixed pin 89 and engaging with a pivotal point between the toggle-links 79 and 80. The pawls 81 and 86 may be held in yielding engagement with their respective rack-bars by means of springs, as described in the first example of my improvement.

It will be seen in effect that the mechanism shown in Fig. 3 is the same as that described for elevating the body portion 4 in the first example of my improvement, and it will be understood that a raising device, as shown in Fig. 3, is arranged one at each end of the vehicle. In operation it will be seen that by rocking the lever 72 the toggle-links will operate the pawls 81 and 86 to move the rack-bars 69 and 65 in opposite directions—that is, when said rack-bars are moved outward in opposite directions the lower ends of the rods 64 and 68 will be moved toward each other, and consequently the body portion 4 will be elevated and may then be rocked on its pivotal connections with said bar 68 to dump a load. The rack-bars will be prevented from backward movement during the elevation of the body portion by means of the dogs 82 and 87, operating in the manner heretofore described in connection with Fig. 1.

In Fig. 4 is shown a two-wheeled cart, comprising a body portion 90, a frame portion 91, from which the shafts extend in the usual manner, and an axle 92, upon which the wheels are placed. The body portion 90 in this example of my improvement is necessarily mounted to tilt downward at its rear end for the purpose of dumping a load, and the means for elevating the body portion 90 is precisely similar to that described in connection with Fig. 3. Therefore a further description thereof is not necessary excepting that the upper ends of the rods 64 and 68 are removably connected to a shaft 93, extended transversely over the top of the body portion 90, and, further, that guide-rods 94 and 95 extend downward from the sides of the body portion and engage over squared portions of the axle 92. In this modification I employ a scale beam and weight instead of the platform or spring scale heretofore described for weighing the load. Extended upward from the axle 92 at each side of the cart is a support-rod 96, and from these support-rods 96 brace-rods 97 extend downward to a connection with the sides of the frame portion 91. The connection between the support-rods 96 and the axle 92 should be such that the said axle may rotate relatively to the support-rods. The upper ends of these support-rods above the body portion 90 are connected by a transverse bar 98, upon which a scale-beam 99 is fulcrumed. This scale-beam 99 will of course be properly graduated and provided with an adjustable weight 100. From the shorter arm of the scale-beam 99 a link 101 depends, and is provided at its lower end with a hook or other suitable fastening device to be removably engaged with the transverse shaft 93. In operation after the load shall have been placed in the body portion 90 the said body portion will be elevated by the means described, and the link 101 must then be engaged with the shaft 93 and the rods 64 and 68 disengaged from said shaft. Then the weighing may proceed by shifting the weight 100 in the usual manner. After weighing the load the rods 64 and 68 are to be again engaged with the shaft 93 and the body portion 90 lowered to a position between the side pieces of the frame 91, and at this time the rods 64 and 68 must be again disengaged from the shaft 93. Then the body portion 90 may be tilted endwise, as the axle 92 will rotate relatively to the supporting-bars 96 and also relatively to the frame 91 and to the wheels.

Having thus described my invention, I claim as new and desire to secure by Letters Patent—

1. A weighing and dumping vehicle, comprising a running-gear, a frame supported thereon, a weighing-platform comprising an upper and lower plate, means for elevating the upper plate relatively to the lower plate, a pointer carried by the lower plate, track-plates supported in the frame, means for elevating said track-plates relatively to the frame, rods extended from the lower plate of the weighing-platform, springs connected to the outer ends of said rods and to the track-plates, and means for elevating the body portion to a position to be engaged by the weighing-platform, substantially as specified.

2. A weighing and dumping wagon, comprising a running-gear, a frame supported thereon, track-plates arranged at the ends of the frame, rotary shafts having bearings in portions of the frame, toggle-links connected at one end to the track-plates and at the other end to fixed portions of the frame, links extended between said toggle-links and arms on the shaft, a weighing-platform, rods extended from the corners of said weighing-platform, rollers on said rods for engagement with the track-plates, springs having connection at one end with the rods and at the other end with the track-plates, a pointer carried by the weighing-platform and a body portion movable relatively to the frame and adapted to rest upon the weighing-platform, substantially as specified.

3. A weighing mechanism for a vehicle, comprising a lower plate, spring-balances supported in the vehicle and with which said lower plate is connected, an upper plate, toggle-link connections between said lower and upper plates, a rotary shaft having bearings on the lower plate, arms extended in opposite directions from said shaft, links extended from said arms to the pivotal points of the toggles, and a pointer carried by the lower plate, substantially as specified.

4. A dumping-wagon, comprising a running-gear, a frame mounted thereon, a body portion having swinging connection relatively to the frame, toggle-links on the opposite sides of the frame, levers for moving said toggle-links of a side toward and from each other, spring-pressed pawls carried by the toggle-links, rack-bars adapted for pivotal connection with the body portion and for engagement with the pawls, spring-yielding dogs adapted also for engagement with said rack-bars, arms having pivotal connection with the toggle-links and each arm having cam-shaped upper ends, pins extended from the dogs and adapted to engage upon one side of said arms, and pins extended from the frame and adapted to engage the opposite sides of said arms and also with the cam portions of said arms, substantially as specified.

5. In a weighing and dumping vehicle, the combination with weighing mechanism, of a running-gear, a frame thereon, a body portion adapted to swing relatively to the frame, toggle-links at the opposite sides of the frame, levers for moving the toggle-links of a side toward and from each other, spring-pressed pawls pivoted to the toggle-links, pivoted rack-bars having engagement with the pawls, spring-yielding dogs engaging with the rack-bars, and connections between the dogs and links, whereby the dogs are operated, substantially as specified.

GEORGE H. FLETCHER.

Witnesses:
 JNO. M. RITTER,
 C. R. FERGUSON.